United States Patent
He et al.

(10) Patent No.: US 9,530,443 B1
(45) Date of Patent: Dec. 27, 2016

(54) METHOD FOR FABRICATING A MAGNETIC RECORDING DEVICE HAVING A HIGH ASPECT RATIO STRUCTURE

(71) Applicant: Western Digital (Fremont), LLC, Fremont, CA (US)

(72) Inventors: Li He, Fremont, CA (US); Jikou Zhou, Pleasanton, CA (US); Ge Yi, San Ramon, CA (US); Dujiang Wan, Fremont, CA (US); Fujian Wang, San Ramon, CA (US)

(73) Assignee: WESTERN DIGITAL (FREMONT), LLC, Fremont, CA (US)

( * ) Notice: Subject to any disclaimer, the term of this patent is extended or adjusted under 35 U.S.C. 154(b) by 0 days.

(21) Appl. No.: 14/750,239

(22) Filed: Jun. 25, 2015

(51) Int. Cl.
 *G11B 5/147* (2006.01)
 *G11B 5/31* (2006.01)
 *G11B 5/60* (2006.01)
 *G11B 5/127* (2006.01)

(52) U.S. Cl.
 CPC ........... *G11B 5/6082* (2013.01); *G11B 5/1278* (2013.01); *G11B 5/1475* (2013.01); *G11B 5/3163* (2013.01); *G11B 5/3173* (2013.01)

(58) Field of Classification Search
 CPC .... G11B 5/1278; G11B 5/1475; G11B 5/3163
 USPC .......... 360/125.03, 125.12, 125.13, 125.3, 360/125.31
 See application file for complete search history.

(56) References Cited

U.S. PATENT DOCUMENTS

| | | |
|---|---|---|
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |

(Continued)

FOREIGN PATENT DOCUMENTS

EP 1228528 3/2001

*Primary Examiner* — Jefferson Evans
(74) *Attorney, Agent, or Firm* — Convergent Law Group LLP (57) ABSTRACT

A method provides a magnetic write apparatus on a substrate. A mask is provided on a substrate. The mask has a trench therein. The trench has a top, a bottom and a plurality of sidewalls extending between the top and the bottom of the trench. The top of the trench is wider than the bottom. A protective layer is provided in the trench. The protective layer extends from the top of the trench along a first portion of the plurality of sidewalls such that the bottom of the trench and a second portion of the plurality of sidewalls are free of the protective layer. The structure is provided in a remaining portion of the trench.

12 Claims, 6 Drawing Sheets

(56) References Cited

U.S. PATENT DOCUMENTS

| | | |
|---|---|---|
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,463,664 B1 * | 10/2002 | Bieg .............. G03F 7/70716 33/1 M |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,483,664 B2 * | 11/2002 | Kamijima ............ G11B 5/3116 360/123.47 |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,540,928 B1 | 4/2003 | Kobrin et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |

(56) References Cited

U.S. PATENT DOCUMENTS

| | | |
|---|---|---|
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Chen et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,771,462 B1 * | 8/2004 | Khizroev ............ G11B 5/1278 360/122 |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,877,213 B2 | 4/2005 | Zolla |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 * | 4/2006 | Knapp ............ G11B 5/3116 360/122 |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |

(56) References Cited

U.S. PATENT DOCUMENTS

| | | |
|---|---|---|
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,549,213 B2 | 6/2009 | Hsu et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 * | 3/2012 | Zhang ............ G11B 5/1278 29/603.12 |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,371,019 B1 | 2/2013 | Zhang et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |

(56) References Cited

U.S. PATENT DOCUMENTS

| | | |
|---|---|---|
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 8,986,556 B2* | 3/2015 | Jin ................... 216/22 |
| 2003/0021064 A1* | 1/2003 | Ohtomo ............ B82Y 10/00 |
| | | 360/125.62 |
| 2003/0193740 A1* | 10/2003 | Kruger ............... G11B 5/1871 |
| | | 360/125.03 |
| 2004/0240109 A1* | 12/2004 | Hamann ............ G11B 5/10 |
| | | 360/125.74 |
| 2008/0026564 A1* | 1/2008 | Frohberg .......... H01L 21/76804 |
| | | 438/637 |
| 2008/0213967 A1* | 9/2008 | Su ................. H01L 27/1087 |
| | | 438/386 |
| 2010/0061016 A1* | 3/2010 | Han ............... G11B 5/1278 |
| | | 360/125.3 |
| 2010/0290157 A1 | 11/2010 | Zhang et al. |
| 2010/0328817 A1* | 12/2010 | Kief ............... C23C 14/14 |
| | | 360/125.03 |
| 2011/0086240 A1 | 4/2011 | Xiang et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |

* cited by examiner

METHOD FOR FABRICATING A MAGNETIC RECORDING DEVICE HAVING A HIGH ASPECT RATIO STRUCTURE

BACKGROUND

Figure 1:
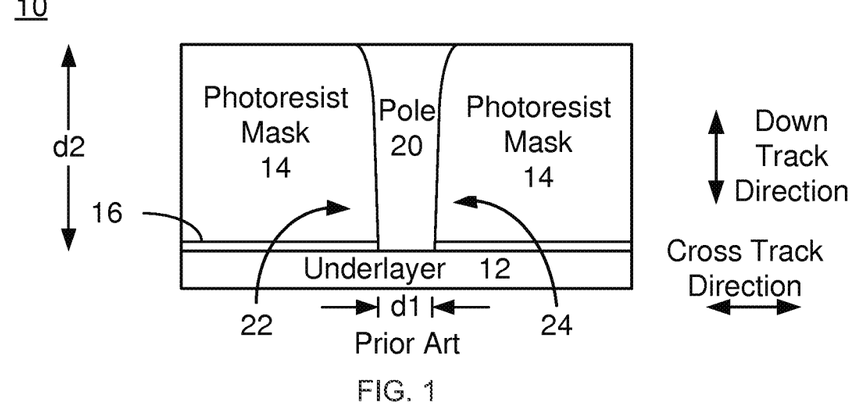
FIG. 1 depicts an ABS view of a conventional magnetic recording head.

FIG. 1 depicts an air-bearing surface (ABS) view of a conventional magnetic recording transducer 10 during formation. The magnetic recording transducer 10 may be a perpendicular magnetic recording (PMR) head or a heat assisted magnetic recording (HAMR) head. The conventional transducer 10 includes an underlayer 12 on which a photoresist mask 14 has been formed. During formation of the photoresist mask 14, a bottom antireflective coating 16 has been used. The photoresist mask 15 has an aperture in which the pole 20 is formed. The pole 20 has pole sidewalls 22 and 24 having a shape that matches the sidewalls of the aperture in the photoresist mask 14. As can be seen in FIG. 1, the main pole 20, and photoresist mask 14, have a width d1 at the bottom of the trench and a height d2. The aspect ratio of the main pole 20, the height of the main pole/aperture and divided by the width at the bottom (d2/d1) is desired to be large.

Although the conventional magnetic recording head 10 functions, there are drawbacks. In particular, the sidewalls 22 and 24 of the main pole 20 may not be vertical. Particularly for a main pole 20 having a high aspect ratio of greater than five, the top of the aperture, and thus the main pole 20, may be noticeably wider than the bottom. In addition, the sidewall angle changes near the top of the pole, as depicted in FIG. 1. This issue is exacerbated at lower pole widths, such as on the order of two hundred nanometer or less. Such low width poles may be formed by trimming the main pole 20. However, it in some cases, such an operation is undesirable. Accordingly, what is needed is a system and method for improving the performance of a magnetic recording head.

DETAILED DESCRIPTION OF THE PREFERRED EMBODIMENTS

Figure 2:
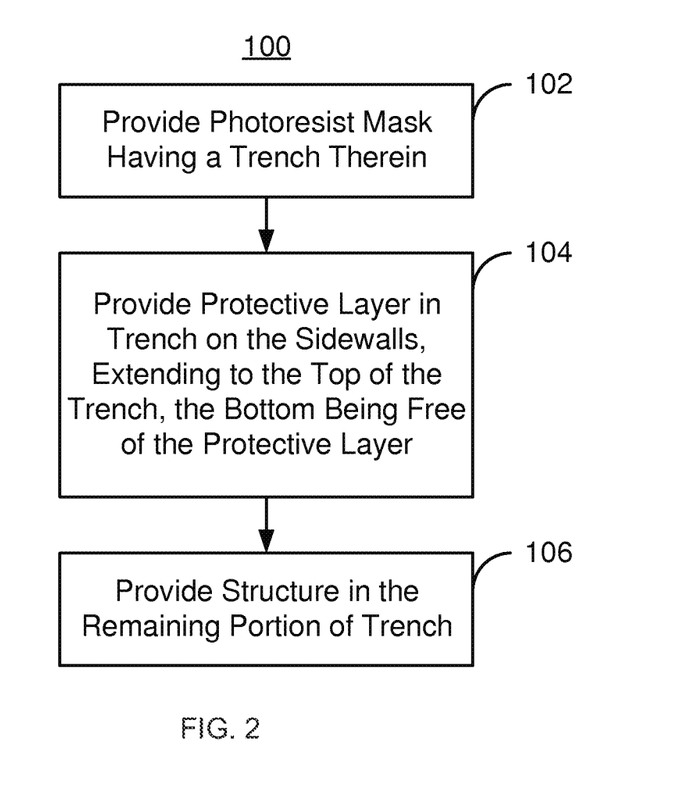
FIG. 2 depicts a flow chart of an exemplary embodiment of a method for providing a magnetic recording transducer having a high aspect ratio structure.

FIG. 2 depicts an exemplary embodiment of a method 100 for providing a magnetic recording device such as a magnetic recording transducer. For simplicity, some steps may be omitted, interleaved, combined and/or performed in another order. FIGS. 3-6 depict views of an exemplary embodiment of a magnetic recording apparatus 200 during fabrication. FIGS. 3-6 are not to scale. The method 100 is described in the context of providing a magnetic recording transducer 200 depicted in FIGS. 3-6. However, the method 100 may be used to fabricate multiple magnetic recording devices at substantially the same time. The method 100 is also described in the context of particular layers. A particular layer may include multiple materials and/or multiple sublayers. The method 100 also may start after formation of other portions of the magnetic recording apparatus. In some embodiments, the method 100 may be used to form a pole in a heat assisted magnetic recording (HAMR) writer. In other embodiments, other structures and/or other magnetic recording devices may be fabricated.

A mask is provided on a substrate, via step 102. The substrate may be considered to be any layers underlying the structure that is desired to be formed. For example, if the structure being formed is a pole in a HAMR transducer, then the substrate may include the underlying slider, read transducer (if any), waveguides and other optics such as a near-field transducer (NFT). The mask provided in step 102 has a trench therein. The trench has a top, a bottom and sidewalls extending between the top and the bottom of the trench. The top of the trench is wider than the bottom. In some embodiments, step 102 includes depositing a bottom antireflective coating (BARC) layer on the substrate, providing a photoresist layer on the BARC layer and selectively exposing a portion of the photoresist layer to light. A portion of the photoresist layer may also be removed in step 102. A remaining portion of the photoresist layer forms the mask.

Figure 3:
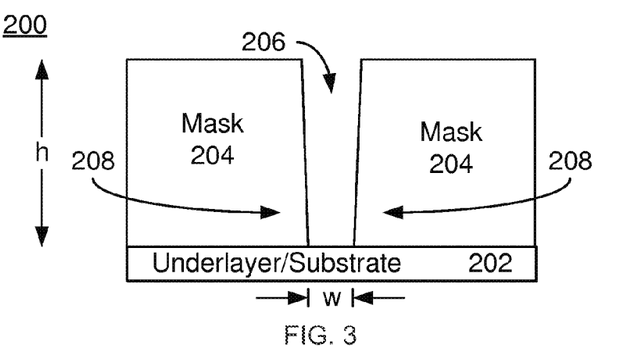
FIGS. 3-6 depict ABS views of an exemplary embodiment of a magnetic write apparatus during fabrication.

FIG. 3 depicts the magnetic recording apparatus 200 after step 102 is performed. Thus, a mask 204 on the underlayer 202 is shown. The underlayer 202 may be considered part of the substrate discussed above. In the HAMR transducer example above, the underlayer 202 may include cladding for a waveguide. In some embodiments, the mask 204 is a photoresist mask. The mask 204 includes a trench 206 having sidewalls 208. The trench 206 has a height, h and a width, w. In some embodiments, the aspect ratio of the trench (h/w) is at least four. In some embodiments, the aspect ratio of the trench 206 is at least five. Also in some embodiments, the width of the trench 206 at the bottom is less than three hundred nanometers (w<300 nm). In some embodiments, the width of the bottom of the trench 206 is two hundred nanometers or less. The height of the photoresist mask may be at least one micron. In other embodiments, other widths and/or aspect ratios are possible. As can be seen in FIG. 3, the top of the trench is wider than the bottom.

A protective layer is provided in the trench 206, via step 104. The protective layer extends from the top of the trench 206 along a portion of the sidewalls 208. However, the bottom of the trench 206 and a second portion of the sidewalls 208 near the bottom are free of the protective layer. In some embodiments, step 104 includes providing a protective layer including amorphous carbon. In other embodiments, the protective layer consists of amorphous carbon. In some embodiments, step 104 includes blanket depositing a film for the protective layer and anisotropically removing a portion of the film. Such an anisotropic removal process tends to remove more material on the surfaces parallel to the top of the mask 204. As a result, a portion of the protective layer film near the bottom of the trench 206 and on the top surface of the mask 204 may be removed.

Figure 4:
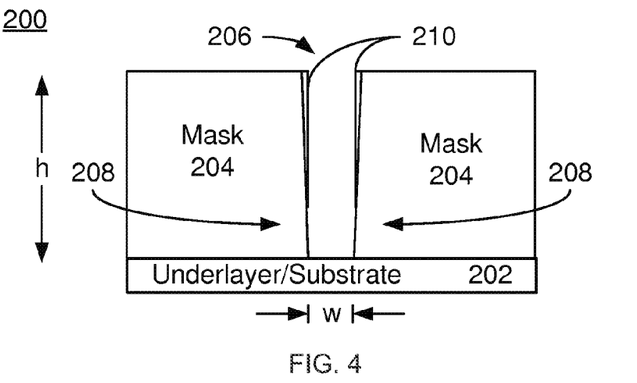

FIG. 4 depicts the magnetic apparatus 200 after step 104 is performed. Thus, the protective layer 210 is present. The protective layer 210 resides at the top of the trench 206. Near the bottom, however, the mask 204 is exposed. As a result, the sidewalls of the remaining portion of the trench 206 may be substantially vertical and linear.

The desired structure is provided in the open portion of the trench 206, via step 106. Step 106 may include plating high saturation magnetization material(s) for a pole and/or otherwise depositing material(s) for the structure being formed. A planarization step may also be performed. After formation of the structure is completed, the mask 204 may be removed.

Figure 5:
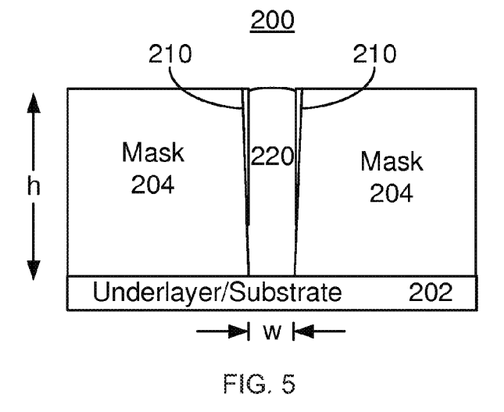
Figure 6:
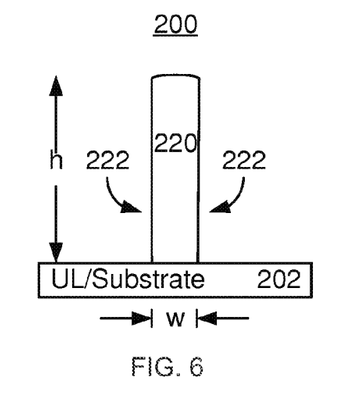

FIG. 5 depicts the write apparatus 200 during step 106. Thus, the structure 220 is formed. Because of the presence of the protective layer 210, the sidewalls of the structure 220 are substantially vertical. In addition, the aspect ratio of the structure 220 may be h/w, substantially the same as the remaining portion of the trench 206. FIG. 6 depicts the magnetic recording apparatus 200 after removal of the mask 200. Thus, a structure 220 having a large aspect ratio and small width has been formed.

Using the method 100, a magnetic recording apparatus having improved performance may be fabricated. In particular, a structure 220 having a small width described above and a large height may be formed. For example, the width of the structure 220 may be two hundred nanometers or less. The height of the structure may be one micron or more. Further, the sidewalls 222 of the structure 220 may be substantially straight and vertical (e.g. perpendicular to the top surface of the underlayer/substrate 202). Thus, the desired geometry of the structure 220 may be obtained. Further, this is achieved with little or no trimming of the structure 220. A trim uses a removal process, such as an anisotropic etch, that removes more material in the vertical direction parallel to the height h. In such a process, a large portion of the underlayer 202 adjacent to the structure 220 may be removed. Thus, underlying structures may be damaged. Use of the method 100 may allow for a high aspect ratio/small width structure 220 to be formed without requiring a trim process. Underlying structures, such as waveguides or other features, need not be damaged. Consequently, fabrication and performance of the magnetic recording apparatus 200 may be improved.

Figure 7:
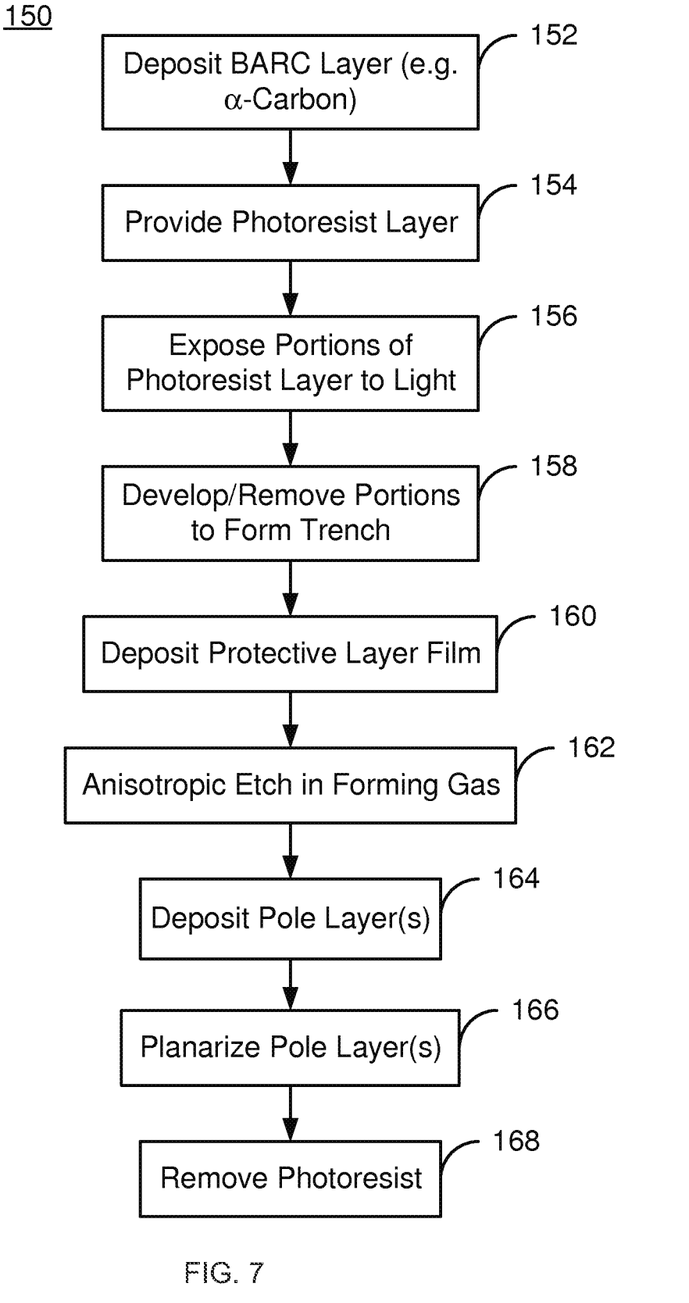
FIG. 7 depicts a flow chart of another exemplary embodiment of a method for providing half side shields.

FIG. 7 depicts an exemplary embodiment of a method 150 for providing a structure such as a write pole for a magnetic recording device. For simplicity, some steps may be omitted, interleaved, performed in another order and/or combined. FIGS. 8-14 depict various views of an exemplary embodiment of a magnetic recording transducer 250 during fabrication. For clarity, FIGS. 8-14 are not to scale. The method 150 is described in the context of providing a single magnetic recording transducer 250 depicted in FIGS. 8-14. Referring to FIGS. 7-14, the method 150 may be used to fabricate multiple magnetic recording heads at substantially the same time. The method 150 may also be used to fabricate other magnetic recording transducers or other devices. The method 150 is also described in the context of particular layers. A particular layer may include multiple materials and/or multiple sub-layers. The method 150 also may start after formation of other portions of the magnetic recording transducer. For example, the method 150 may start after a read transducer, return pole/shield and/or other structure have been fabricated. In some embodiments, the method 150 is used to fabricate a write pole for a HAMR transducer.

A BARC layer is provided on the substrate, via step 152. Step 152 may include depositing a material, such as amorphous carbon, with the appropriate thickness for the light being used in fabrication of the photoresist mask. For example, in some embodiments, an amorphous carbon BARC layer that is nominally three hundred Angstroms thick might be used. In other embodiments, other materials might be used for the BARC layer. For example, SiN might be combined with amorphous carbon when a pole is being fabricated. SiN might be used alone for other structures.

Figure 8:
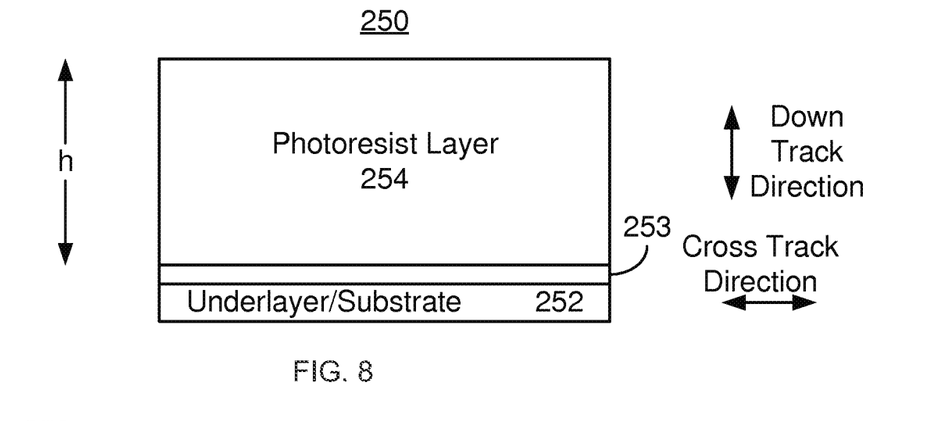
FIGS. 8 through 14 depict views of an exemplary embodiment of a magnetic recording transducer fabricated using the method.

A photoresist layer is provided, via step 154. For example, the photoresist might be spin coated or otherwise deposited on the device being fabricated. FIG. 8 depicts an ABS view of the transducer 250 after step 154 is completed. Thus, the BARC 253 and photoresist layer 254 are shown on an underlayer/substrate 252. In some embodiments, the height, h, of the photoresist layer 254 is at least one micron. In some embodiments, the photoresist layer 254 may be 1.5 micron or more thick.

Figure 9:
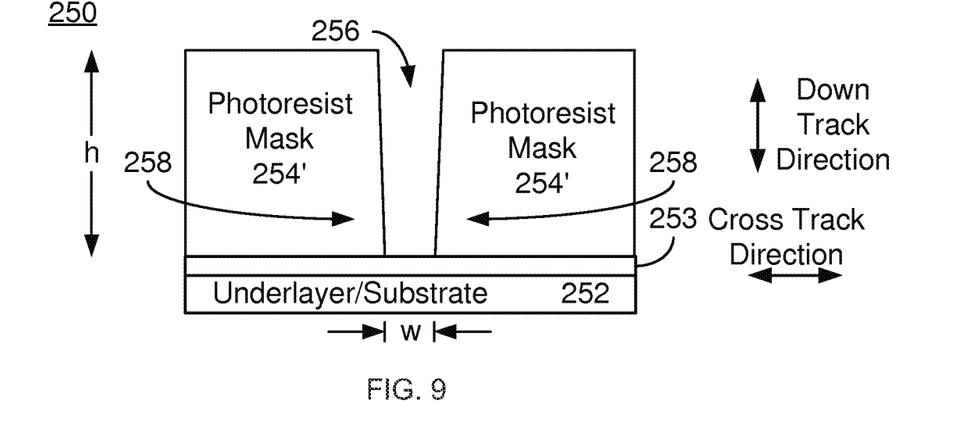

Selected portions of the photoresist layer 254 are exposed to light, via step 156. The photoresist layer 254 is then exposed to developer and a portion of the photoresist layer removed, via step 158. Thus, a photoresist mask is formed. FIG. 9 depicts the transducer 250 after step 156 is performed. Thus, a trench 256 having sidewalls 258 is formed in the photoresist mask 254'. As can be seen in FIG. 9, the sidewalls 258 are not vertical.

Figure 10:
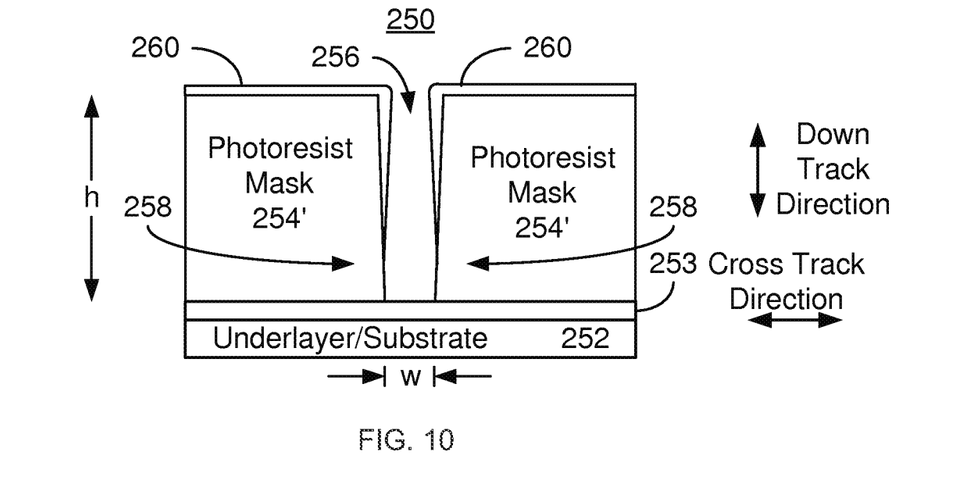

A protective layer film is deposited, via step 160. Step 160 may include depositing an amorphous carbon layer. FIG. 10 depicts the transducer 250 after step 160 is performed. Thus, a protective layer film 260 has been deposited. In some embodiments, the thickness of the protective film 260 is at least one nanometer thick and not more than eight nanometers thick. In some such embodiments, the protective layer film 260 is at least two nanometers and not more than five nanometers thick. However, other thicknesses are possible. As can be seen in FIG. 10, the top of the remaining portion of the trench 256 may now be smaller than the bottom. The protective layer film 260 is desired to protect the photoresist mask from removal during a subsequent etch step 162. In some embodiments, the protective layer film 260 includes amorphous carbon. In other embodiments, the protective layer consists of amorphous carbon.

The BARC layer 253 at the bottom of the trench 256 is removed, via step 162. Step 162 may be performed by carrying out an anisotropic reactive ion etch in a forming gas, such as $N_2H_2$. Such an anisotropic removal process tends to remove more material on the surfaces parallel to the top of the photoresist mask 254'. As a result, a portion of the protective layer film 260 at the top of the photoresist mask 254' may be removed. The portion of the BARC layer 253 exposed in the trench 256 is also removed.

Figure 11:
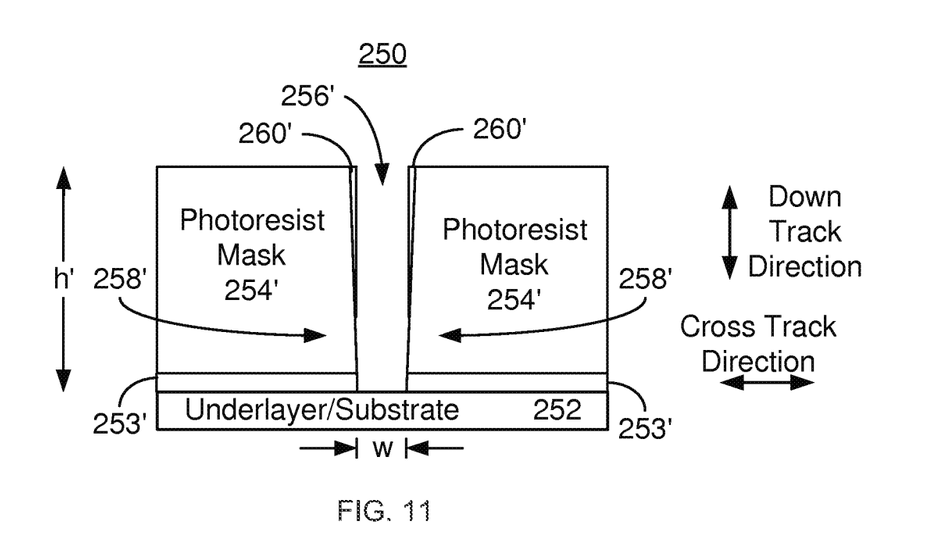

FIG. 11 depicts the transducer 250 after step 162 is performed. Thus, a protective layer 260' remains inside the trench 256'. The remaining (e.g. open) portion of the trench 256' may have substantially vertical sidewalls. Thus, an increase in the width of the top of the trench 256' is avoided. In addition, the BARC 253' within the trench 256' has been removed. The remaining BARC layer 253' is covered by the photoresist mask 254'.

Figure 12:
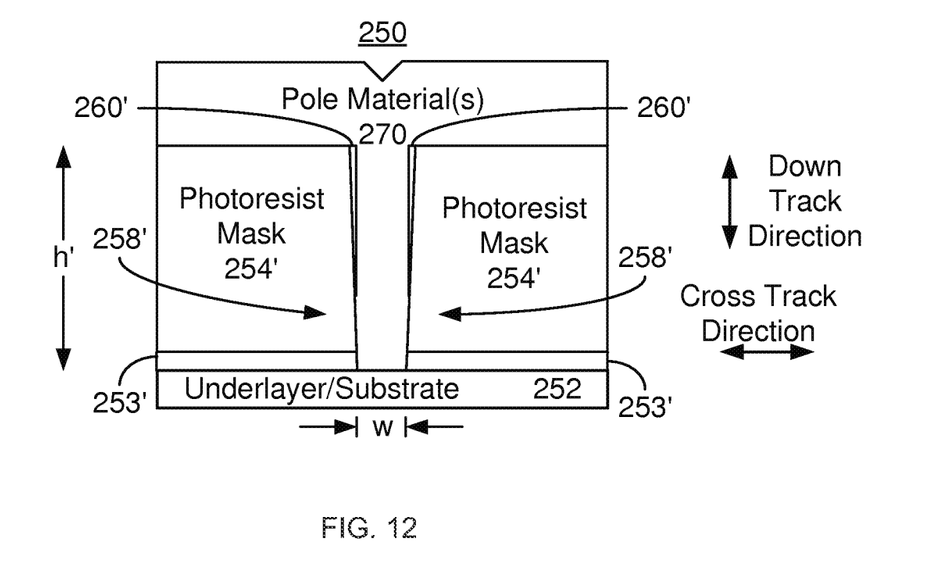
Figure 13:
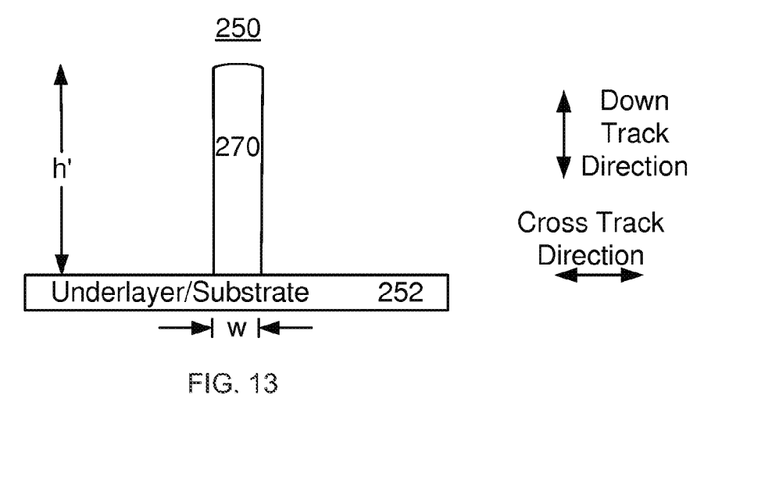
Figure 14:
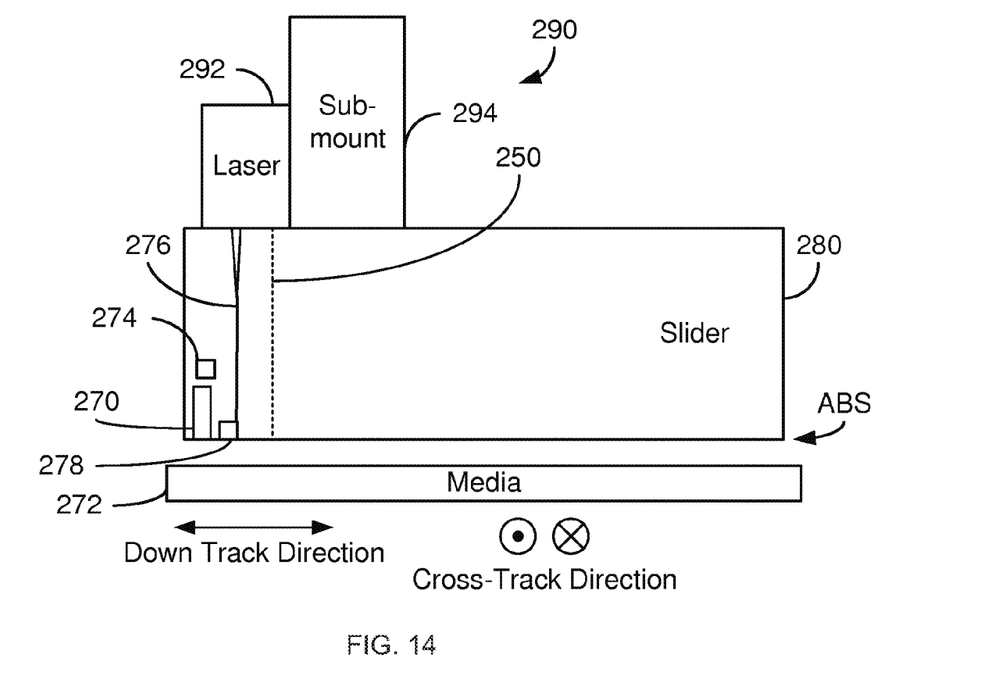

The layer(s) for the main pole are deposited, via step 164. In some embodiments, step 164 may include plating the main pole material(s). Because the BARC layer 253 at the bottom of the trench 256' has been removed, plating may be better performed. FIG. 12 depicts the transducer 250 after step 164 has been performed. Thus the pole materials 270 fill the remaining portion of the trench. However, the pole material(s) 270 extend outside of the trench 256'. Consequently, a planarization step, such as a chemical mechanical planarization (CMP) is performed, via step 166. The photoresist mask 254' may then be removed, via step 168. FIG. 13 depicts the transducer 250 after step 168 is performed. Because of the presence of the protective layer 260', the sidewalls of the pole 270' are substantially vertical. In addition, the aspect ratio of the structure 270 may be h/w, substantially the same as the remaining portion of the trench 206. Thus, the main pole 270 having a large aspect ratio and small width has been formed. FIG. 14 depicts a side view of a HAMR disk drive in which the main pole 270 being formed using the method 150 may reside. The HAMR disk drive includes a media 272, the transducer 250, a slider 280 and a laser subassembly 290. The laser subassembly 290 may include a laser 292 and a submount 294 for mechanical stability. The HAMR transducer 250 includes the main pole 270 as well as a waveguide 276, NFT 272 and coil(s) that energize the main pole 270.

Using the method 150, a magnetic transducer such as the HAMR transducer 250 having improved performance may be fabricated. In particular, a main pole 270 having a small width described above and a large height may be formed. For example, the width of the main pole 270 may be two hundred nanometers or less. The height of the main pole 270 may be one micron or more. Further, the sidewalls of the main pole 270 may be substantially straight and vertical (perpendicular to the top surface of the underlayer/substrate 252). Thus, the desired geometry of the main pole 270 may be obtained. Further, this is achieved with little or no trimming of the main pole 270. Thus, damage to the underlying NFT 272, waveguide 276 and/or other structures may be avoided. Consequently, fabrication and performance of the magnetic recording transducer 250 may be improved.

We claim:

1. A method for fabricating a magnetic apparatus comprising:
   providing a mask on a substrate, the mask having a trench therein, the trench having a top, a bottom and a plurality of sidewalls extending between the top and the bottom of the trench, the top of the trench being wider than the bottom;
   providing a protective layer in the trench, the protective layer extending from the top of the trench along a first portion of the plurality of sidewalls such that the bottom of the trench and a second portion of the plurality of sidewalls are free of the protective layer; and
   providing a structure in a remaining portion of the trench.

2. The method of claim 1 wherein the step of providing the mask further includes:
   depositing a bottom antireflective coating (BARC) layer on the substrate;
   providing a photoresist layer on the BARC layer;
   selectively exposing a portion of the photoresist layer to light; and
   removing a portion of the photoresist layer, a remaining portion of the photoresist layer forming the mask.

3. The method of claim 2 wherein the step of providing the protective layer further includes:
   blanket depositing a protective layer film, a first portion of the protective layer film residing in the trench, a second portion of the protective layer film residing on the mask; and
   performing an anisotropic etch such that a portion of the BARC layer exposed at the bottom of the trench and at least the second portion of the protective layer film are removed.

4. The method of claim 2 wherein the step of providing the protective layer further includes:
   blanket depositing a protective layer film, a first portion of the protective layer film residing in the trench, a second portion of the protective layer film residing on the mask; and
   performing an anisotropic etch such that a portion of the BARC layer exposed at the bottom of the trench and at least the second portion of the protective layer film are removed.

5. The method of claim 4 wherein the anisotropic etch step removes a third portion of the protective layer film within the trench such that the remaining portion of the trench has substantially vertical sidewalls.

6. The method of claim 1 wherein the structure is a pole.

7. The method of claim 1 wherein the magnetic apparatus is a heat assisted magnetic recording transducer.

8. The method of claim 1 wherein the trench has a height and the bottom has a width, the height divided by the width being at least four.

9. The method of claim 8 wherein the height divided by the width is at least five.

10. The method of claim 1 wherein the mask has a thickness of at least one micron and the bottom of the trench is not more than two hundred nanometers wide.

11. The method of claim 1 wherein the protective layer includes amorphous carbon.

12. A method for fabricating a magnetic write apparatus comprising:
    depositing a bottom antireflective coating (BARC) layer on a substrate;
    providing a photoresist layer on the BARC layer, the BARC layer comprising amorphous carbon;
    selectively exposing a portion of the photoresist layer to light;
    removing a portion of the photoresist layer, a remaining portion of the photoresist layer forming a photoresist mask having a trench therein, the trench having a top, a bottom and a plurality of sidewalls extending between the top and the bottom of the trench, the top of the trench being wider than the bottom, the photoresist mask being at least one micron thick, the bottom of the trench having a width of not more than two hundred nanometers;
    blanket depositing a protective layer film, a first portion of the protective layer film residing in the trench, a second portion of the protective layer film residing on the photoresist mask, the protective layer film consisting of amorphous carbon; and
    performing an anisotropic etch such that a portion of the BARC layer exposed at the bottom of the trench and at least the second portion of the protective layer film are removed, a remaining portion of the protective layer film forming a protective layer in the trench, the protective layer extending from the top of the trench along a first portion of the plurality of sidewalls such that the bottom of the trench and a second portion of the plurality of sidewalls are free of the protective layer, a remaining portion of the trench having sidewall that are substantially linear and perpendicular to the bottom; and
    providing a pole in the remaining portion of the trench.

* * * * *